United States Patent
Moein et al.

(10) Patent No.: US 7,171,718 B2
(45) Date of Patent: *Feb. 6, 2007

(54) DIRECT DRIVE WINDSHIELD WIPER ASSEMBLY

(75) Inventors: Arman Moein, Grand Blane, MI (US); David Emery Peck, Rochester Hills, MI (US)

(73) Assignee: TRICO Products Corporation, Rochester Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/228,703

(22) Filed: Sep. 16, 2005

(65) Prior Publication Data

US 2006/0021176 A1    Feb. 2, 2006

Related U.S. Application Data

(63) Continuation of application No. 10/146,190, filed on May 15, 2002, now Pat. No. 6,944,906.

(51) Int. Cl.
*B60S 1/08*    (2006.01)

(52) U.S. Cl. ............... 15/250.3; 310/68 R; 310/66; 310/83; 310/156.01; 318/DIG. 2; 318/443; 318/444

(58) Field of Classification Search ........... 15/250.3, 15/250.001, 250.16, 250.12, 250.17; 318/DIG. 2, 318/443, 444; 310/83, 89, 66, 77, 67 R, 310/272, 273, 68 B, 68 R, 156.01
See application file for complete search history.

(56) References Cited

U.S. PATENT DOCUMENTS

| | | | |
|---|---|---|---|
| 1,350,822 A | 8/1920 | McNitt | 475/337 |
| 1,945,361 A | 1/1934 | Ball | 475/149 |
| 3,967,271 A | 6/1976 | Day | 340/347 |
| 4,021,714 A | 5/1977 | Jones et al. | 318/594 |
| 4,072,884 A | 2/1978 | Treadwell | 318/314 |
| 4,095,158 A | 6/1978 | Matsumoto | 318/603 |
| 4,099,104 A | 7/1978 | Muller | 318/138 |
| 4,115,715 A | 9/1978 | Muller | 310/68 |
| 4,125,792 A | 11/1978 | Schmider | 310/268 |
| 4,194,184 A | 3/1980 | Hartmann et al. | 340/347 |
| 4,259,603 A | 3/1981 | Uchiyama et al. | 310/68 |
| 4,264,850 A | 4/1981 | Cannon et al. | 318/574 |
| 4,310,790 A | 1/1982 | Mulet-Marquis | 318/608 |
| 4,529,922 A | 7/1985 | Ono | 318/603 |
| 4,546,299 A | 10/1985 | Veale | 318/608 |
| 4,585,980 A | 4/1986 | Gille et al. | 318/444 |
| 4,623,831 A | 11/1986 | Sakamoto et al. | 318/799 |
| 4,647,827 A | 3/1987 | Toyoda et al. | 318/592 |
| 4,665,488 A | 5/1987 | Graham et al. | 364/424 |
| 4,680,515 A | 7/1987 | Crook | 318/318 |

(Continued)

*Primary Examiner*—Gary K. Graham
(74) *Attorney, Agent, or Firm*—Bliss McGlynn, P.C.

(57) ABSTRACT

A windshield wiper assembly including at least one motor having an output shaft and a windshield wiper operatively connected to the output shaft. The motor includes a stator adapted to provide an electromagnetic flux and a rotor assembly supported for rotation about the stator. The rotor assembly includes a back iron and an annular magnet mounted to the back iron so as to be disposed in radially spaced relationship about the stator. The rotor assembly is operatively connected to the output shaft and responsive to electromagnetic flux generated by the stator so as to provide a rotational force to the output shaft to drive the windshield wiper in repeated wiping motion across the windshield.

10 Claims, 5 Drawing Sheets

U.S. PATENT DOCUMENTS

| | | | |
|---|---|---|---|
| 4,723,100 A | 2/1988 | Horikawa et al. | 318/254 |
| 4,818,907 A | 4/1989 | Shirotori | 310/67 |
| 4,847,527 A | 7/1989 | Dohogne | 310/218 |
| 4,897,583 A | 1/1990 | Rees | 318/254 |
| 4,900,995 A | 2/1990 | Wainwright | 318/443 |
| 4,952,830 A | 8/1990 | Shirakawa | 310/68 |
| 4,962,331 A | 10/1990 | Smith | 310/261 |
| 5,072,179 A | 12/1991 | Miller et al. | 324/207.16 |
| 5,082,745 A * | 1/1992 | Ohashi | 428/552 |
| 5,252,897 A | 10/1993 | Porter et al. | 318/443 |
| 5,355,061 A | 10/1994 | Forhan | 318/443 |
| 5,588,173 A | 12/1996 | Battlogg | 15/250.3 |
| 5,747,910 A | 5/1998 | Haner | 310/180 |
| 6,037,735 A | 3/2000 | Janosky et al. | 318/608 |
| 6,084,323 A * | 7/2000 | Pelstring et al. | 310/67 R |
| 6,104,112 A * | 8/2000 | Vanjani | 310/64 |
| 6,255,751 B1 | 7/2001 | Hoffmann | 310/83 |
| 6,281,649 B1 | 8/2001 | Ouellette et al. | 318/443 |
| 6,700,279 B1 | 3/2004 | Uchiyama et al. | 310/190 |
| 6,727,614 B2 | 4/2004 | Neubauer et al. | 310/75 |
| 6,944,906 B2 * | 9/2005 | Moein et al. | 15/250.3 |

* cited by examiner

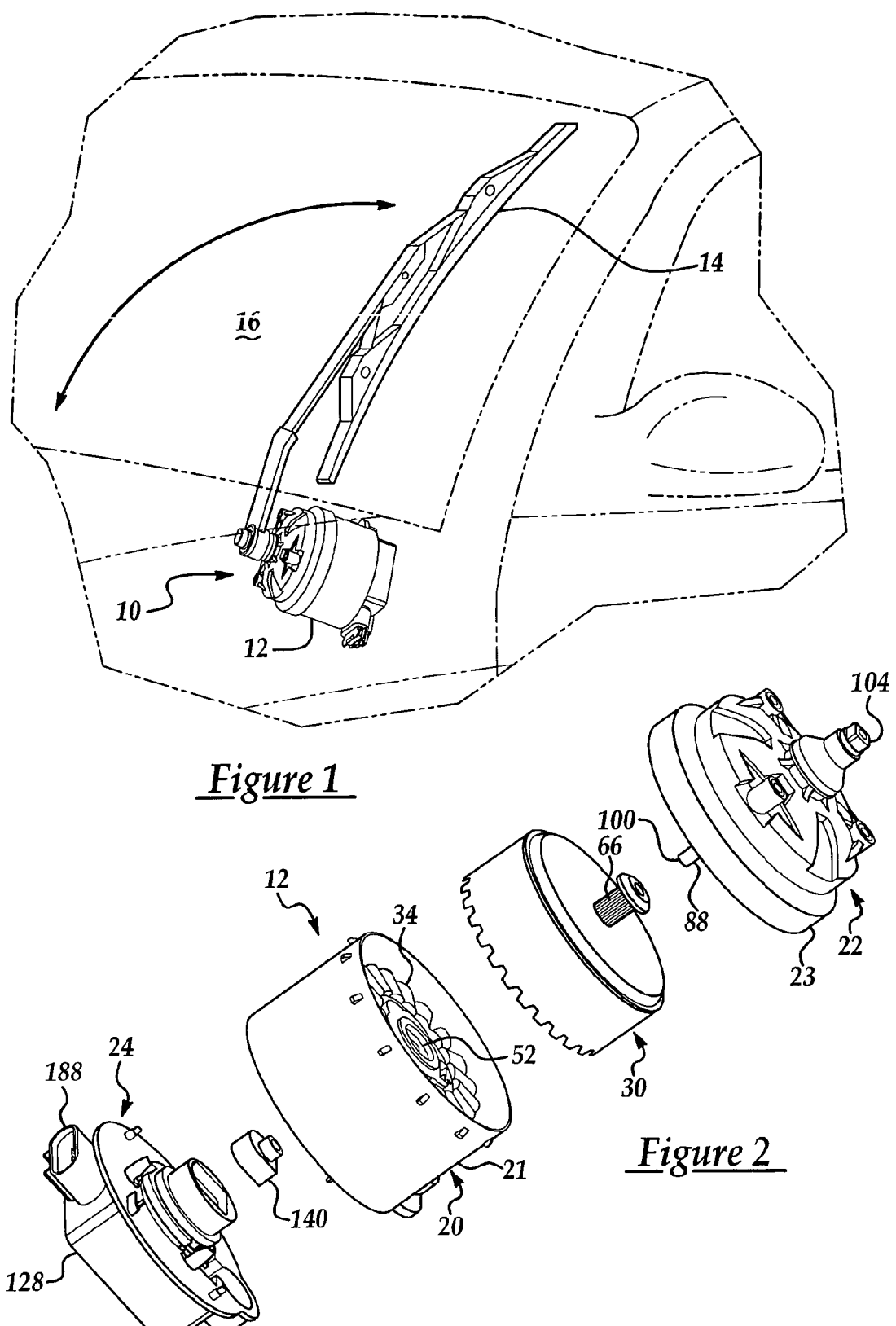

DIRECT DRIVE WINDSHIELD WIPER ASSEMBLY

CROSS-REFERENCE TO RELATED APPLICATION(S)

The present application is a continuation of U.S. Ser. No. 10/146,190, filed May 15, 2002, entitled "Direct Drive Windshield Wiper Assembly," issued on Sep. 20, 2005 having U.S. Pat. No. 6,944,906.

BACKGROUND OF THE INVENTION

1. Field of the Invention

The present invention relates generally to windshield wiper systems and, more particularly, to a windshield wiper system that utilizes individual direct drive motors for coordinated, but mechanically independent, control of the windshield wipers.

2. Description of the Related Art

Windshield wiper systems commonly employed in the related art include pivotally mounted wiper blades that are oscillated across a windshield between an in-wipe position, typically located near the cowl of an automotive vehicle, and an out-wipe position, usually associated with an A-pillar on the vehicle, in the case of the driver side wiper blade in this representative example. It is typically desirable to maximize the angular velocity of the blade assemblies between the in-wipe and out-wipe positions where the blade assembly is moving across the windshield in front of the driver to reduce the duration of each wipe cycle. On the other hand, it is also desirable to limit noise and inertia loading by reducing the velocity of the blade assemblies as they approach the wipe limits. These are two competing objectives that must be balanced in order to be successfully and economically obtained.

One long-standing design approach that has been employed in the related art includes the use of a single motor assembly, driven in one rotational direction, driving two separate wiper arms across the windshield of a vehicle. This approach requires a fairly complex linkage system to convert the singular angular motion of the wiper motor into the two-way linear reciprocal motion to drive both wiper arms. In the dashboard-firewall area, where these systems are typically installed, this mechanical linkage requires a large amount of underhood space. Moreover, the area near this moving linkage must be kept clear of wires and other vehicle components. Additionally, the moving linkage, with its several pivot and rotational points is subject to mechanical inaccuracies and wear, readily introducing excessive wiper movement.

Nevertheless, for many years, designers and manufacturers were reluctant to depart from this established approach. However, improved vehicle aerodynamics that have fostered vehicle designs having longer sloped front surfaces are leading to windshield designs with more pronounced rake angles that result in larger window surfaces. A wiper system for such windshields must therefore include longer, more massive wiper arms and blades to wipe the required percentage of the larger surface. This has created a number of problems. Most notably, the larger arms and swept surface area increases the size of conventional wiper systems to such an extent that it becomes difficult to fit a single motor system within the typically allotted underhood space. This problem is further aggravated by the same aerodynamic sloped front surfaces of the newer vehicle designs, which reduce the available underhood space. Additionally, the larger area to be swept by the wiper system requires more power and control over the wiper arm that can be provided by a linkage type system.

In response to the changes in vehicle front face design and the loss of available underhood space, the dual motor wiper system has evolved. Representative examples of such systems can be found in U.S. Pat. No. 4,585,980 to Gille et al.; U.S. Pat. No. 4,665,488 to Graham et al.; U.S. Pat. No. 4,900,995 to Wainwright; and U.S. Pat. No. 5,252,897 to Porter et al. These wiper systems are generally directly driven. Additionally, U.S. Pat. No. 5,355,061 to Forham employs a brushless dc motor to operate a direct drive windshield wiper system, as do others that follow. The more recent direct drive wiper blade systems employing dual motors have utilized some hardware and/or software controlled switching scheme to control each individual motor, in reference to the other, to provide blade control across the windshield and prevent blade-to-blade contact.

The conventional control approach relies upon intricate software control and position sensing along the wipe pattern. This undesirably requires separate motor control circuitry and a reliance on the movement of the wiper motors to provide positional feedback. Generally, motor position feedback has been used in brushless dc motors by sensing the changes in the commutation of the motor windings. This has sometimes been done using Hall Effect sensors, as disclosed, for example, in U.S. Pat. No. 4,680,515 to Crook; U.S. Pat. No. 4,723,100 to Horikawa et al.; and U.S. Pat. No. 4,897,583 to Rees. The Hall Effect sensors have also been used to count pulses of a pulse train generated by a rotating toothed wheel to produce position signals for operational control of the motor. While suitable for use in windshield wiper systems, the use of the above-noted brushless dc motor controllers in a windshield wiper system that uses separate position sensors for coordination of the wipers can result in an unnecessarily complicated design. Also, any loss of power to the system will disorient and confuse these sensors such that the wiper arm position becomes an unknown. Thus, windshield wiper systems that employ pulse train type sensors suffer from the disadvantage that they easily loose the accurate position of the windshield wiper blade during common operating conditions and therefore suffer a loss of control in these circumstances.

The build-up of snow and ice on the windshield complicates the control of blade movement and the ability to accurately determine wiper arm position and can impede the movement of the blades unevenly, causing one blade to move faster than the other. When encountering this problem, electronically controlled wiper systems presently known in the art can often become unsynchronized and may clash as they become unable to maintain their sense of wiper arm position. Thus, there is a need in the art for a direct drive motor for a windshield wiper system that has integrated control circuitry and achieves position sensing such that the wiper arms position is known regardless of rotation and such that the detected arm position is not lost during power loss or loss of motion.

Conventional dual direct drive wiper systems use high-speed dc motors. This is undesirable, as it requires large counter-rotational forces to stop and then reverse the wiper arm at the end of its sweep. Also, large current draws are necessary to produce the counter-rotational forces which causes repetitive surges in the supplied power and induces great amounts of electro-magnetic interference to the immediately surrounding parts of the vehicle. With a high-speed dc motor, it is also problematic to vary the speed of the wiper arm as it sweeps across the windshield, if this is desired as part of a sweeping pattern or predetermined clearing scheme. These drawbacks stem from the conventional construction of direct drive wiper motors, which have either a one-to-one direct drive or an inefficient gearing assembly to differ the wiper arm speed from motor speed. Thus, there is also a need in the art for a direct drive motor for a windshield wiper system that is efficient and controllable at a lower drive speed and that is electro-magnetically clean.

One other drawback to conventional wiper motor systems has recently emerged. The conventional direct drive windshield wiper systems employ dc motors that are of the standard 12-volt operating standard. This is presently adequate, but current design trends are moving toward more efficient 42 volt based automotive electrical systems. The change over to a 42 volt automotive electrical systems will be highly problematic for the prior dual direct drive wiper systems and presents a considerable drawback as the prior systems are not compatible. Therefore, there is a need to not only provide a direct drive windshield wiper system that overcomes the above-mentioned drawbacks but that also has the ability to be employed in the newly emerging 42 volt automotive electrical system environment.

SUMMARY OF THE INVENTION AND ADVANTAGES

Each of the disadvantages that presently exist in the related art as discussed above is overcome in the direct drive windshield wiper assembly of the present invention. This direct drive windshield wiper assembly includes at least one brushless DC motor providing a drive torque through an output that is rotatable about the longitudinal axis of the motor and a windshield wiper that is driven by the motor about the longitudinal axis in a repeated wiping motion across the surface of a windshield. The motor includes a planetary gear set having an output shaft. The gear set is coaxially disposed relative to the rotational output and the longitudinal axis of the motor and operatively interconnects the drive torque and the windshield wiper. The gear set is further operable to reduce the speed of the rotational output of the motor to the windshield wiper through the output shaft of the gear set.

The direct drive windshield wiper assembly according to the present invention may also include a position sensor that is adapted to sense the speed and position of the motor output. The position sensor includes a flux ring holder that is fixedly mounted within the motor and is adapted to support at least one flux ring thereupon. A magnet holder is operatively connected to the output of the motor and is adapted for rotation therewith. The magnet holder supports at least one magnet in spaced parallel relationship with respect to the flux ring. In addition, the motor includes a position sensor circuit that produces signals corresponding to the rotational speed and position of the windshield wiper.

In another alternate embodiment, the direct drive windshield wiper assembly of the present invention includes at least one brushless DC motor that provides a drive torque through an output and a windshield wiper that is driven by the motor in a repeated wiping motion across the surface of the windshield. The motor includes a housing and a stator fixedly supported within the housing. A rotor is rotatably supported within the housing and is disposed about the stationary stator. The rotor is operatively connected to the output of the motor and controllable to rotate in either direction thereby providing bi-directional rotation to the windshield wiper. In addition, the direct drive windshield wiper assembly further includes a latching mechanism that acts to secure the rotor and thus the output of the motor in a non-rotational disposition when the motor is off.

In still another embodiment of the direct drive windshield wiper assembly of the present invention the motor may further include a programmable control circuit that acts to control the operation of the motor so as to affect the position and speed of the windshield wiper.

One advantage of the windshield wiper system of the present invention is that it utilizes individual direct drive motors for coordinated, but mechanically independent control of the windshield wiper. The present invention acts to maximize the angular velocity of the blade assemblies between in-wipe and out-wipe positions thereby reducing the duration of each wipe cycle while limiting the noise and inertia loading by efficiently structuring a brushless DC motor and by controlling the velocity of the blade assemblies as they approach the wipe limits when the direction of the wiper assembly must be reversed.

Another advantage of the windshield wiper system of the present invention is that the sweep speed and velocity of the wiper assembly within the wipe cycle may be controlled to reduce the time the wiper assembly spends in the driver's view area of the windshield thereby reducing the visual obstruction of the wiper assembly.

Another advantage of the windshield wiper system of the present invention is that it eliminates the complex linkages employed in the related art to convert single angular motion of the wipe motor into two-way linear reciprocal motion used to drive one or more windshield wiper arms. Thus, the present invention requires a smaller operational envelope than devices employed in the related art.

Another advantage of the present invention is that it employs a position sensor that senses the rotational speed and position of the windshield wiper and will not loose its position parameter even in the event of a power loss. Thus, the windshield wiper system of the present invention will not become unsynchronized and therefore will not clash due to an inability to maintain the sense of wiper arm position.

Another advantage of the present invention is that it employs a latching mechanism that secures the motor and thus the output of the motor in a non-rotational disposition when the motor is off.

Another advantage of the present invention is that it includes an integrated control circuitry that achieves position sensing such that the wiper arm position is known regardless of rotation and such that the detected arm position is not lost during power loss or loss of motion.

Still another advantage of the windshield wiper system of the present invention is that it may be employed in either a standard 12 volt or the more efficient 42 volt-based automotive electrical system.

BRIEF DESCRIPTION OF THE DRAWINGS

Other advantages of the invention will be readily appreciated as the same becomes better understood by reference to the following detailed description when considered in connection with the accompanying drawings, wherein:

FIG. 1 is an assembled view of the preferred embodiment of the present invention of a direct drive windshield wiper assembly;

FIG. 2 is an exploded view of the assemblies of the preferred embodiment of the present invention;

DETAILED DESCRIPTION OF THE PREFERRED EMBODIMENT(S)

Figure 3:
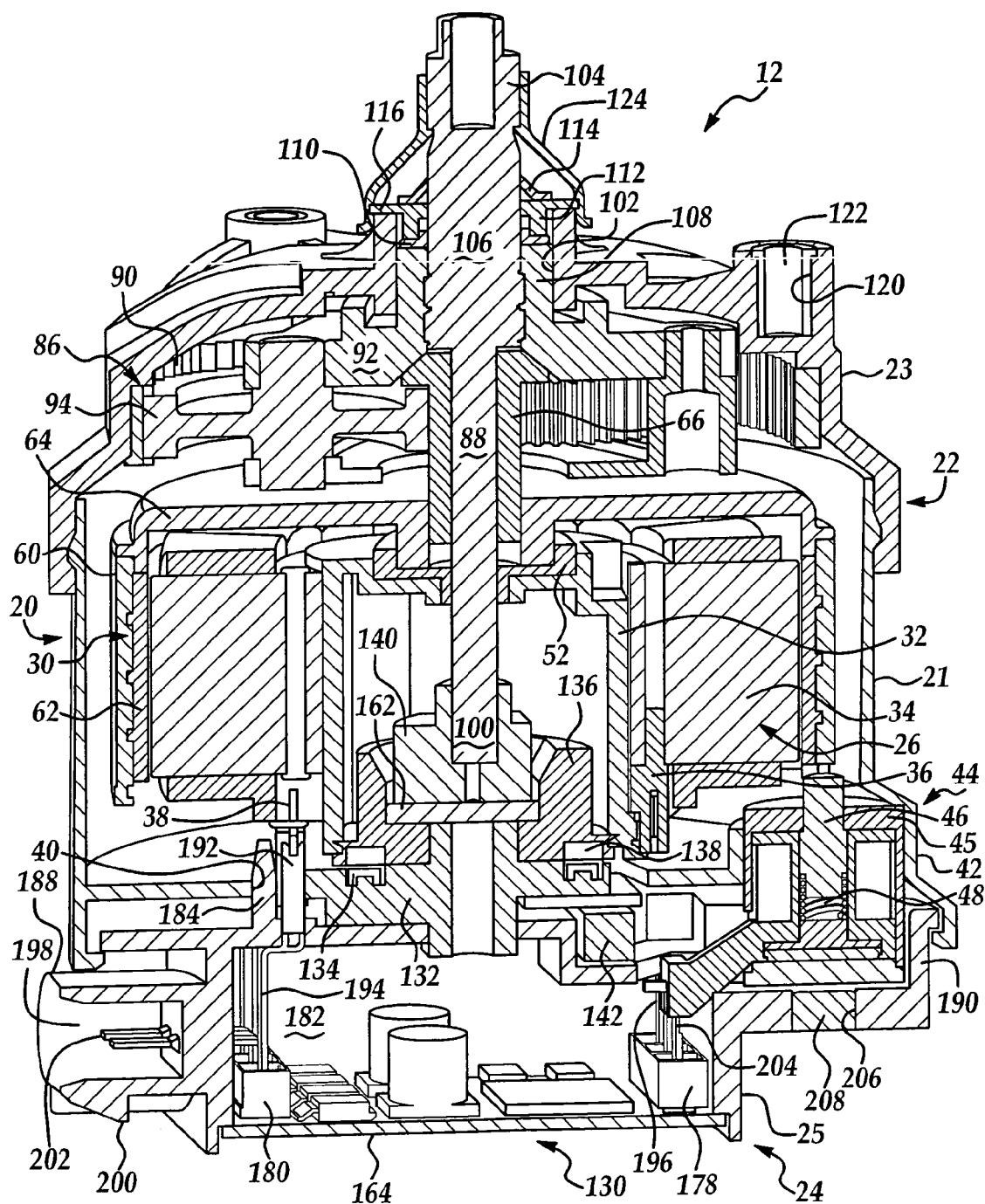
FIG. 3 is a cross-sectional view of the assemblies of the preferred embodiment of the present invention and their physical relationship to each other.

Referring now to the figures where like numerals are used to designate like structure throughout the drawings, a direct drive windshield wiper assembly of the present invention is generally indicated at 10. As shown in FIG. 1, the direct drive windshield wiper assembly 10 includes at least one motor 12 that rotatably drives a windshield wiper 14 across the surface of a windshield 16. Generally speaking, the motor 12 provides a drive torque through an output that is rotatable about the longitudinal axis of the motor 12 so that the windshield wiper 14 is driven about the same longitudinal axis in a repeated wiping motion across the surface of the windshield 16. The motor 12 further controllable to rotate in either direction, thereby providing bi-directional rotation to the windshield wiper 14. In addition, from the description that follows, those having ordinary skill in the art will appreciate that the windshield wiper assembly of the present invention may encompass two or more motors 12, each that drive a windshield wiper 14 in repeated wiping motion across the surface of a windshield 16. It should also be appreciated that the motor 12 may be of a brushless DC, a switched reluctance, or an induction type motor without departing from the spirit and scope of the invention. However, for purposes of description and not by way of limitation, it will be described generally as a brushless DC motor in this specification. In the preferred embodiment, each motor 12 is electronically interconnected and controlled in a manner that will be described in greater detail below.

Specifically, as best shown in FIG. 2, the motor 12 includes a motor assembly, generally indicated at 20, a gear set assembly, generally indicated at 22, operatively supported on one end of the motor assembly 20 and an electronics assembly, generally indicated at 24, operatively supported on the motor assembly 20 opposite the gear set assembly 22. In the preferred embodiment, the gear set assembly 22, and the electronics assembly 24 are made of a plastic material composition formed by an injection molding process for ease of construction, weight, strength, and environmental considerations. The motor assembly 20 is made of a magnesium alloy to remove heat and dampen electromagnetic interference and may be formed by an injection molding process. It should be appreciated by those of ordinary skill in the art that any of a variety of materials may be successfully employed in the manufacture of these parts.

Figure 4:
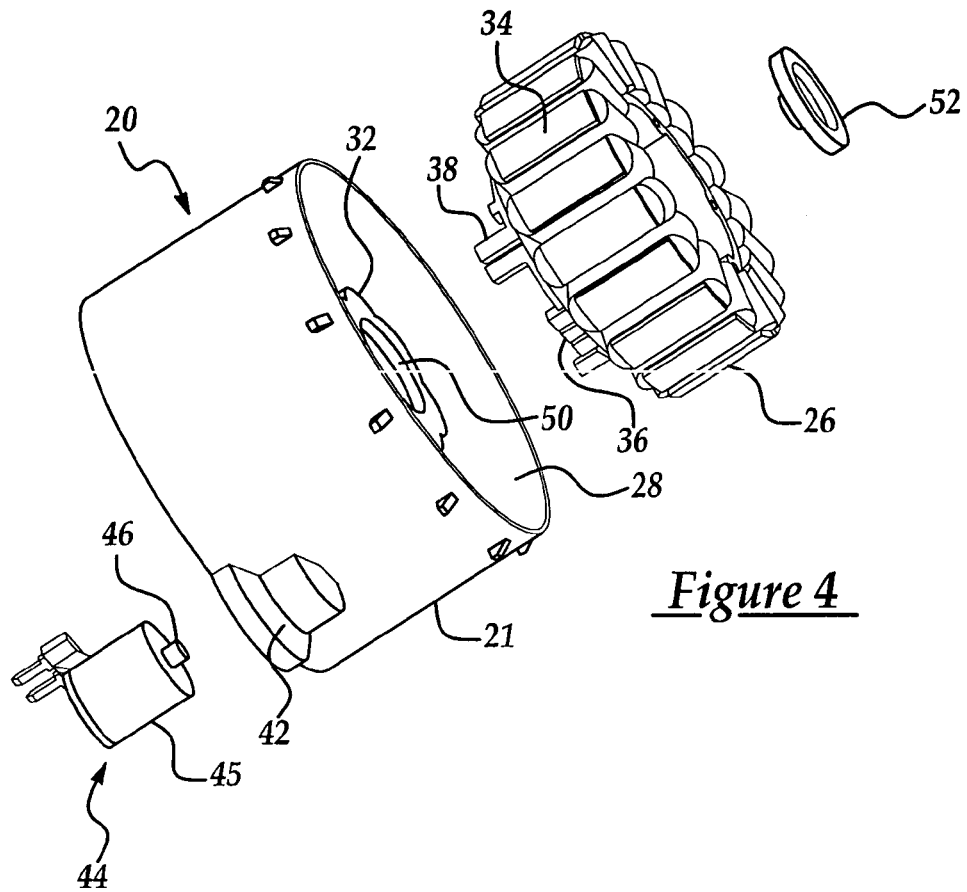
FIG. 4 is an exploded view of the motor housing assembly of the preferred embodiment of the present invention.

As shown in FIGS. 3 and 4, the motor assembly 20 includes a housing 21 that is formed in a general cup shape and encloses a stator 26 that is fixedly supported within an inner cavity 28 of the motor housing 21, and a rotor assembly 30 that is rotatably supported within the motor housing 21 and disposed about the stationary stator 26. The stator 26 is formed in the shape of an annular ring having an open center and is disposed over a hollow cylindrical center hub 32 within the motor housing 20. The stator 26 is constructed in a known manner having either a plurality of stamped lamination pieces 34 stacked together or being of a one-piece molded powder metal. The stator 26 is conventionally wire wound and has an end plate 36 that is adapted to readily retain the ends of the wire windings while offering a plurality of connector points 38 for connection to the electronics assembly 24. The connector points 38 of the stator end plate 36 are accessible through openings 40 in the base of the motor housing 21. The center hub 32 of the motor housing 21 also has a bearing recess 50 (FIG. 4) that receives and retains the rotor bearing 52 (FIG. 3). The rotor bearing 52 serves to rotatively support the rotor assembly 30 as described below.

Figure 5:
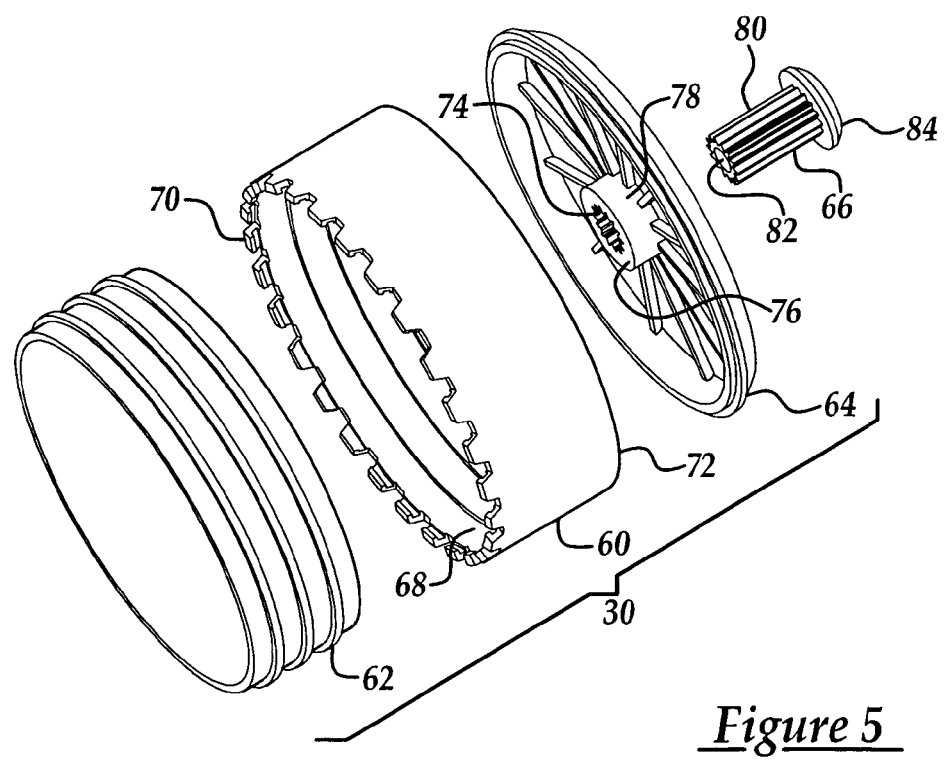
FIG. 5 is an exploded view of the rotor assembly of the preferred embodiment of the present invention.

As shown in FIGS. 3 and 5, the rotor assembly 30 includes a back iron 60, a motor magnet 62 that is operatively supported by the back iron 60 and a rotor cap 64. A sun gear 66 is operatively mounted to the rotor cap 64 as will be described in greater detail below. The back iron 60 is generally shaped as a sleeve having an inner circumference 68 upon which the motor magnet 62 is molded. Alternately, the motor magnet 62 may be glued and pressed into the back iron 60. Thus the back iron 60 provides rigid support for the motor magnet 62. In the preferred embodiment, a molded permanent magnet of a composition of Nb—Fe—B (Niobium, Iron, and Boron) is desirable for its strength and durability. The Nb—Fe—B compound is also easy to mass produce and produces tight, short magnetic flux lines, which generate a magnetic field that is stronger than other moldable magnetic compounds allowing the magnet to be smaller and lighter. However, it will be appreciated by those having ordinary skill in the art that any of a variety of magnetic compounds may be used or that non-molded magnets may also be employed without departing from the spirit and scope of the present invention.

The disk-shaped rotor cap 64 is fixedly mounted to the upper edge 72 of the rotor back iron 60, so that the rotor assembly 30 forms a cup-shape that is received by the motor housing 21. The rotor cap 64 has a central opening 74 and a bearing surface 76. The bearing surface 76 is disposed on the inner side of the rotor cap 64 and is received by and engaged to the rotor bearing 52 that is disposed within the center hub 32 within the motor housing 21. The central opening 74 of the rotor cap 64 is splined at 78 and adapted to complementarily receive in splined engagement the gear teeth 80 of a sun gear 66. Alternately, the sun gear 66 may be operatively interconnected to the rotor cap 64 using any other suitable means commonly known in the art. The sun gear 66 also has a central opening 82 and may include a truncated conical head 84 at one end.

Figure 6:
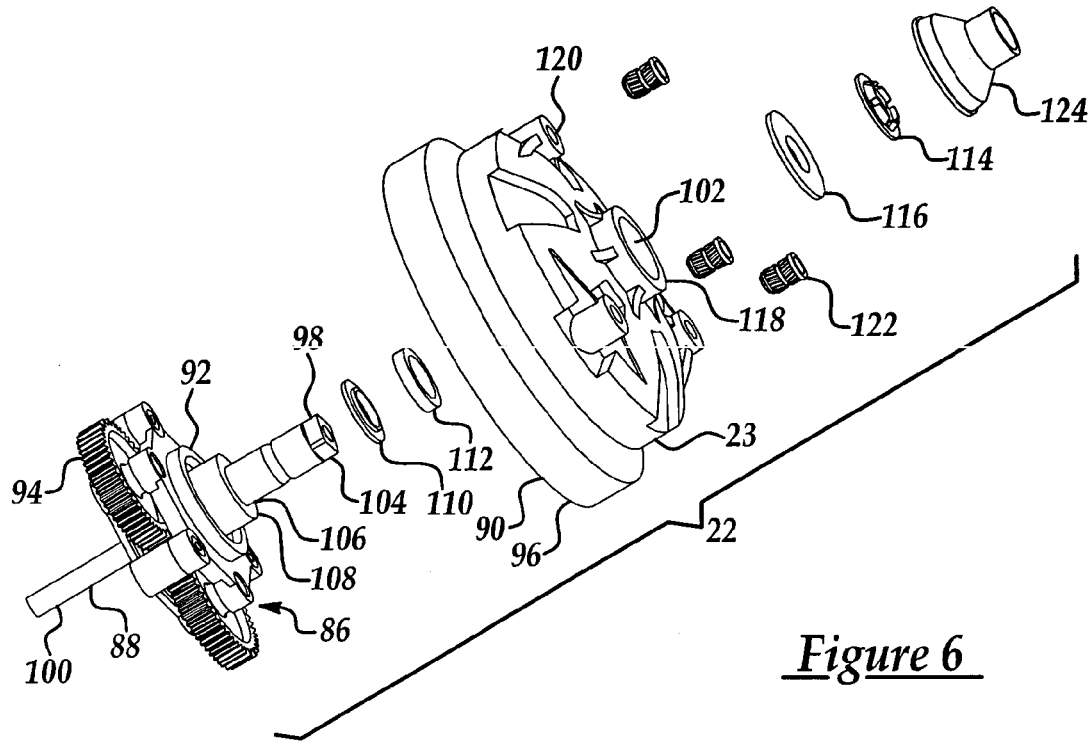
FIG. 6 is an exploded view of the gear housing assembly of the preferred embodiment of the present invention.

As shown in FIGS. 3 and 6, the gear assembly 22 includes a gear housing 23 that is formed in a general cup shape and includes a planetary gear set, generally indicated at 86. The gear set 86 is coaxially disposed relative to the rotational output of the rotor assembly 30 and is thus coaxial to the longitudinal axis of the motor 12 and operatively interconnects the motor drive torque and the windshield wiper 14. The gear set 86 is further operable to reduce the speed of the rotational output of the motor 12 to the windshield wiper 14 through the output shaft 88 of the gear set 86.

In the preferred embodiment illustrated in these figures, the gear set 86 includes an output shaft 88, a ring gear 90, a carrier 92, and a plurality of planet gears 94 operatively supported by the carrier 92. The planet gears 94 are supported within a two-piece carrier 92 in meshing relationship with the ring gear 90 of the planetary gear set 86 and the sun gear 66 of the rotor assembly 30. The ring gear 90 is fixedly disposed within the inner circumference 96 of the gear housing 22. The output shaft 88 has a wiper end 98 and a sensor end 100. The sensor end 100 defines a predetermined diameter that can be narrower than the wiper end 98.

The wiper end 98 of the output shaft 88 extends outward through a central opening 102 of the gear housing 23. The exposed portion 104 of the wiper end 98 is machined in a manner to receive and retain the end of a windshield wiper 14. It should be appreciated by those of ordinary skill in the art that the exposed portion of the wiper end 98 of the output shaft 88 may be splined or otherwise keyed to rotationally secure the wiper 14. However, as will be discussed in greater detail below, there is no necessity for orienting the wiper 14 to a particular angular position of the output shaft 88 as the "park", and lower and upper sweep limits of the wiper 14 are programmable and software calibrated on the vehicle once the direct drive windshield wiper assembly 10 is installed.

As best shown in FIG. 3, the output shaft 88 also has a carrier interface portion 106 adjacent to the exposed portion 104. The carrier interface portion 106 is received by, and operatively connected to, a hollow center sleeve 108 of the carrier 92. It should be appreciated that the carrier 92 may be connected to the output shaft 88 by splines, a keyway, or any of a variety of connection methods. Thus, the central opening 102 of the gear housing 23 has an inner diameter sufficient to receive the combined carrier center sleeve 108 and the output shaft 88. As can be seen in FIGS. 3 and 6, a spring 110 and a spring washer 112 have an inside and outside diameter that allows them to be received by the gear housing central opening 102 while being disposed over the output shaft wiper end 98 above the carrier center sleeve 108. A push nut 114 and push nut washer 116 are disposed over the wiper end 98 of the output shaft 88, such that the push nut washer 116 rotatively rides on the outer end surface 118 of the gear housing central opening 102 while causing a compressive biasing force to be placed on the spring 110 and spring washer 112 within the gear housing central opening 102 against the end of the carrier center sleeve 108. The push nut 114 serves to lockingly engage the output shaft 88 and hold the push nut washer 116, the spring 110, and the spring washer 112 in place without the need of threads. The compressive, or biasing force, imparted by the spring 110 serves to maintain the longitudinal alignment of the components of planetary gear set 86 with the rotor assembly 30 and the stator 26, as the carrier 92 is supportively biased against the truncated conical lip 84 of the sun gear 66. Also, the biasing force of the spring 110 bears against the lip 84 so that the planet gears 94 maintain their alignment against the sun gear 66, as seen in FIG. 3.

The sun gear 66 is operatively driven by the rotational output of the brushless DC motor 12 by its direct connection to the rotor cap 64 of the rotor assembly 30. As noted above, the carrier 92 is operatively connected to the output shaft 88, and the ring gear 90 is fixedly mounted to the gear set housing 23 in a fixed position. Thus, in operation, rotation of the sun gear 66 causes the planet gears 94 to revolve around the ring gear 66 thereby rotating the carrier 92 and the output shaft 88 of said gear set about the longitudinal axis of the motor. The rotor assembly 30, gear set 86, and output shaft 88 within the motor 12, are all in coaxial relationship to each other.

The motor housing 21 further includes a recess 42 that is designed to accommodate a portion of a latching mechanism, generally indicated at 44. The back iron 60 of the rotor assembly 30 includes a plurality of notches 70 disposed about its lower edge. The latching mechanism 44 acts to secure the rotor assembly 30 and thus the output shaft 88 of the gear set 86 in non-rotational disposition when the motor 12 is off. More specifically, the latching mechanism 44 includes an electromagnetic actuator 45 and a latching member 46. In the preferred embodiment, the electromagnetic actuator is a solenoid 45 that operatively drives the latching member 46 to a retracted position. In addition, the latching mechanism 44 includes a biasing member 48 that produces a biasing force in a direction opposite of that produced by the solenoid 45 such that the latching member 46 engages at least one of the notches 70 formed on the back iron 60 of the rotor assembly 30 thereby immobilizing it. On the other hand, the electromagnetic force generated by the solenoid 45 is sufficient to overcome the biasing force to allow rotation of the rotor which allows the latching member 46 of the latching solenoid 44 to disengage from the notch 70 and thereby releasing the back iron 60 allowing it to rotate. In the preferred embodiment, the biasing member 48 is a coiled spring that normally biases the latching member 46 to the engaged position securing the rotor assembly 30 and thus, the output shaft 88 in non-rotational disposition when the motor 12 is off.

The gear housing 23 further includes a plurality of recessed bores 120 formed in the outer surface that receive and retain a like number of threaded inserts 122. The treaded inserts 122 provide mounting points for the direct drive windshield wiper assembly 10 to locate and secure the assembly within the vehicle. Alternately, the direct drive windshield wiper assembly 10 may be mounted using a flange mount disposed upon the gear housing 23 or any other suitable mounting method commonly known in the art. A rubber boot 124 is sealingly disposed over the output shaft wiper end 98 and the gear housing central opening 102 in a manner that prevents environmental elements from entering the motor assembly 12 but allows the output shaft 88 to freely rotate as necessary.

As best seen in FIG. 3, the output shaft 88 is received through a central opening in the sun gear 66 and through the center opening of the bearing assembly 52, and extends inward into the hollow center hub 32 of the motor housing 21. The output shaft 88 is not physically connected to either the sun gear 66 or the rotor bearing 52 but is free to rotate within them. In this manner, the sensor end 100 of the output shaft 88 is operatively connected to a position sensor as discussed below.

Figure 7:
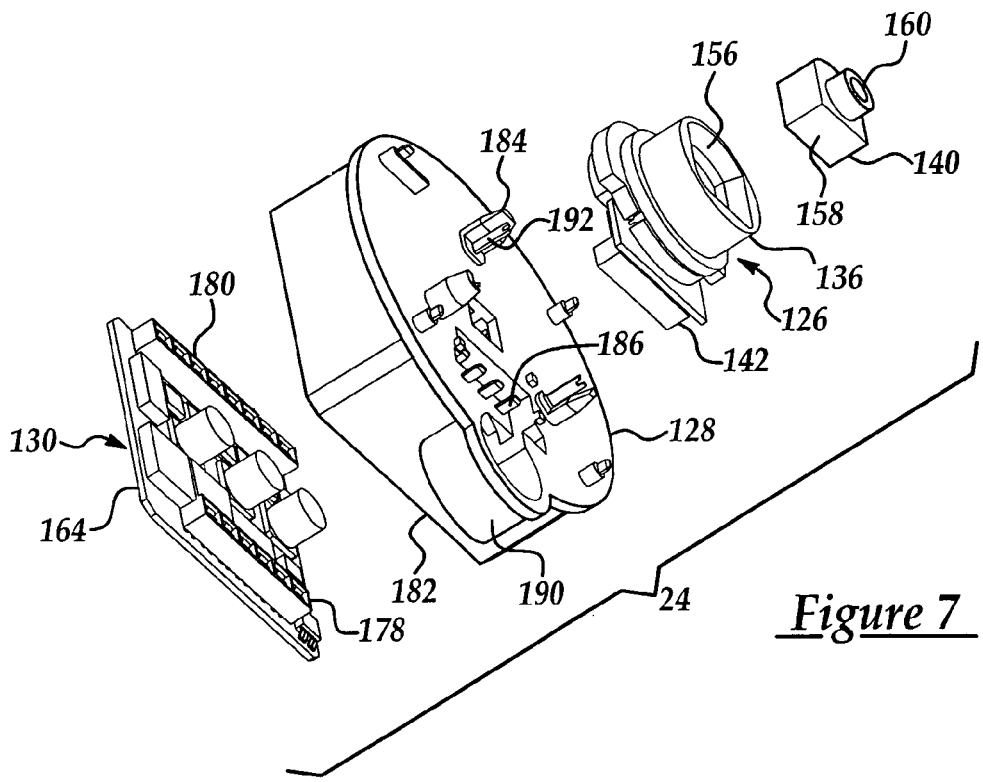
FIG. 7 is an exploded view of the electronics housing of the preferred embodiment of the present invention.
Figure 7A:
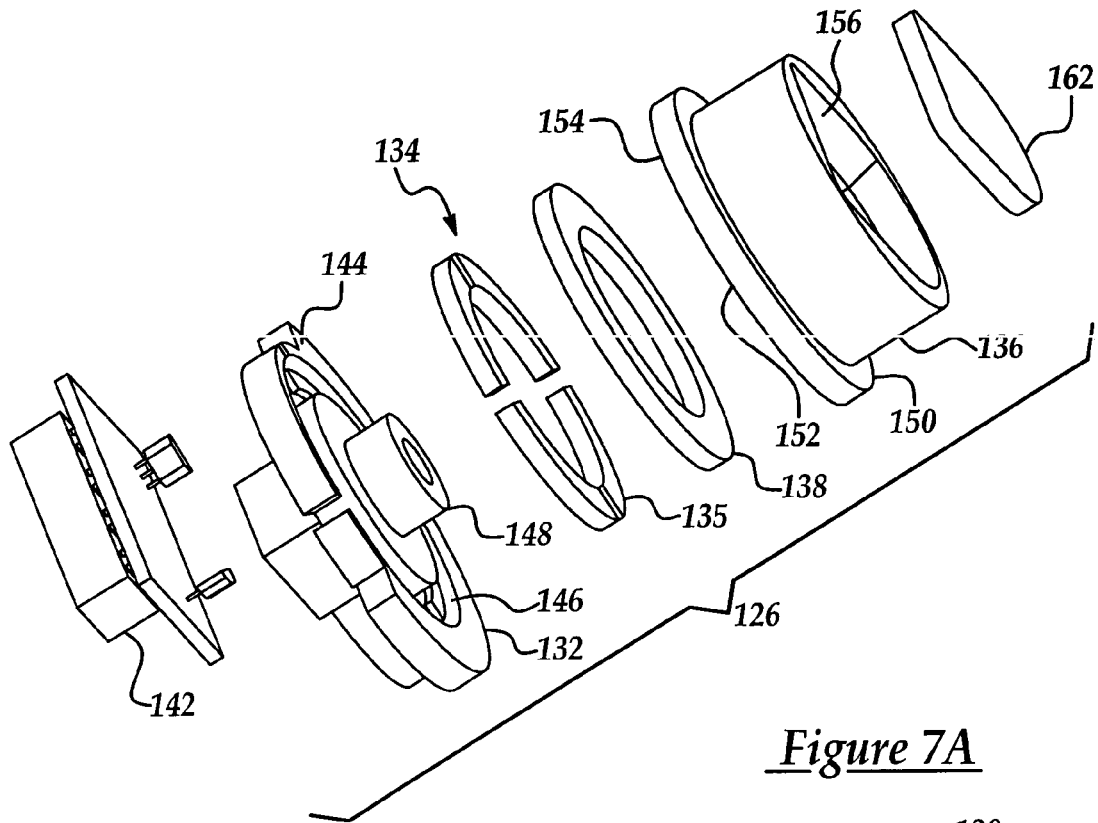
FIG. 7A is an exploded detail view of the position sensor assembly of the electronics housing in the preferred embodiment of the present invention.

As illustrated in FIG. 7, the electronics assembly 24 of the motor 12 includes a position sensor assembly 126, an end cap 128, and a programmable control circuit 130. As shown in detail in FIG. 7A, the position sensor assembly 126 is disposed upon the end cap 128 and is adapted to sense the speed and position of the output shaft 88. The position sensor assembly 126 includes a flux ring holder, generally indicated at 132, that fixedly supports at least one flux ring 134, and a magnet holder, generally indicated at 136, that fixedly supports at least one magnet 138 in spaced parallel relationship with respect to the flux ring 134. The position sensor assembly 126 also includes an output shaft coupler, generally indicated at 140, and a position sensor circuit, generally indicated at 142 for a purpose that will be explained in greater detail below.

The flux ring holder 132 is generally disk shaped having an end face 144. The flux ring holder 132 is fixedly mounted to the end cap 128 and has an annular shaped slot 146 in its end face 144 to receive and retain the at least one flux ring 134. The flux ring 134 is formed from a magnetically permeable material that is electrically capable of detecting variations in magnetic flux lines as they pass over and through the ring. The flux ring holder end face 144 also has an extended cylindrical protrusion 148 that extends toward the magnet holder 136.

The magnet holder 136 is generally cylinder shaped having an end face 150 that is designed to abut the flux ring holder end face 144. The magnet holder end face 150 has a receiving bore 152 that receives the cylindrical protrusion 148 of the flux ring holder 132, which serves as a rotational axis for the magnet holder 136. The magnet holder 136 further includes an annular shaped slot 154 in its end face 150 that is adapted to receive and retain an at least one magnet 138. On the end opposite to the end face 150, the magnet holder 136 has a recessed cavity 156 that receives and retains the output shaft coupler 140. The output shaft coupler 140 has a magnet holder portion 158 and an output shaft receiving end 160. The output shaft coupler 140 serves as the physical connection between the position sensor assembly 126 and the output shaft sensor end 100.

The magnet holder portion 158 of the output shaft coupler 140 is formed in a shape complementary to be received and retained by the recessed cavity 156 of the magnet holder 136 and the output shaft receiving end 160 is formed in a shape to receive and retained the sensor end 100 of the output shaft 88. A foam insert 162 is disposed within the recessed cavity 156 for shock absorption. It should be appreciated by those having ordinary skill in the art that the shaped portions of the recessed cavity 156 and the output shaft coupler 140 may be formed in any suitable geometric shape, as it is not necessary to have a zero degree orientation based on a physical reference point for the output shaft 88. As will be discussed in greater detail below, the "park", and the inner and outer sweep limits to the wiper, and hence the output shaft 88 of the direct drive windshield wiper system 10, are programmed into the present invention after it is installed on the vehicle.

The position sensor circuit 142 is supported upon the flux ring holder 132 and is in electrical communication with, and receives electromagnetic signals from, the flux ring 134. More specifically, the position sensor circuit 142 measures the flux variations generated within the flux ring 134. The position sensor circuit 142 is also in electrical communication with the programmable control circuit 130. The flux variations from the flux ring 134 are sensed as two quadrature electrical signals as the magnet 138, held within the magnet holder 136, is rotated about the stationary flux ring 134 by the rotating output shaft 88. In the preferred embodiment, a plurality of flux sectors 135 form the flux ring 134 and are offset eccentrically from a single magnet 138. The flux ring 134 is positioned such that the magnetic field induced within the flux ring 134 varies uniquely for all angular displacements in the rotation of the output shaft 88. In this manner, the position sensor circuit 142 produces an instantaneous signal that is representative of a particular angular displacement of the output shaft 88 thereby allowing the position sensor 126 to act as an absolute position sensor for detecting the angular position of the output shaft 88. Additionally, as the output shaft 88 moves, the position sensor circuit 142 continuously produces position signals. Dynamically, this series of signals allows the direction and speed of the output shaft 88 to be determined. In the preferred embodiment, the magnet 138 is bipolar, however it should be appreciated that the magnet 138 may also have multiple poles about its circumference.

In another non-limiting embodiment, at least one magnet 138 of an annular ring shape is offset eccentrically from a single flux ring 134. In either case, since the position of the magnet 138 varies the flux, no power is required by the position sensor assembly 126 to follow the position of the output shaft. Thus, if the power to the windshield wiper assembly 10 fails or the power to the vehicle is removed, the windshield wiper assembly 10 does not lose its orientation and can instantly recover its positional information after power restoration. Therefore, the position sensor circuit 142 interprets the magnetic flux signals and produces an output denoting the absolute position of the output shaft 88 and routes that signal to the programmable control circuit 130.

Alternately, the position sensor assembly 126 may be replaced by a park sensing assembly. The park sensing assembly includes a magnetic "park platform" disposed on the output shaft and a "park" hall sensor mounted within the motor to detect the park platform. When the wiper assembly 10 is mounted to a vehicle, the wiper assembly 10 is oriented so that during the first half of the wipe area, the park platform is positioned such that it covers the park sensor. If the wiper assembly 10 is operating and the power is lost and then recovered, the park hall sensor will be in a relative position to either sense the park platform or not. If the park sensor senses the park platform, then the output shaft is in the first half of the wipe area and it is safe for the microprocessor to perform an out-wipe. If the park hall sensor does not sense the platform then the output shaft must be on the second half of the wipe area and it is safe for the microprocessor to perform an in-wipe. In either case, the park sensor will detect the platform edge, which is used as the position reference along the wipe path. This platform crossing provides opportunity for the microprocessor to obtain correct position. It should be noted that this embodiment must be used with additional physical sensors positioned about the motor windings that would provide a "pulse train" of position signals for an accurate determination of wiper arm position. This pulse train would be available with the "sensored" commutation scheme discussed below.

Figure 8:
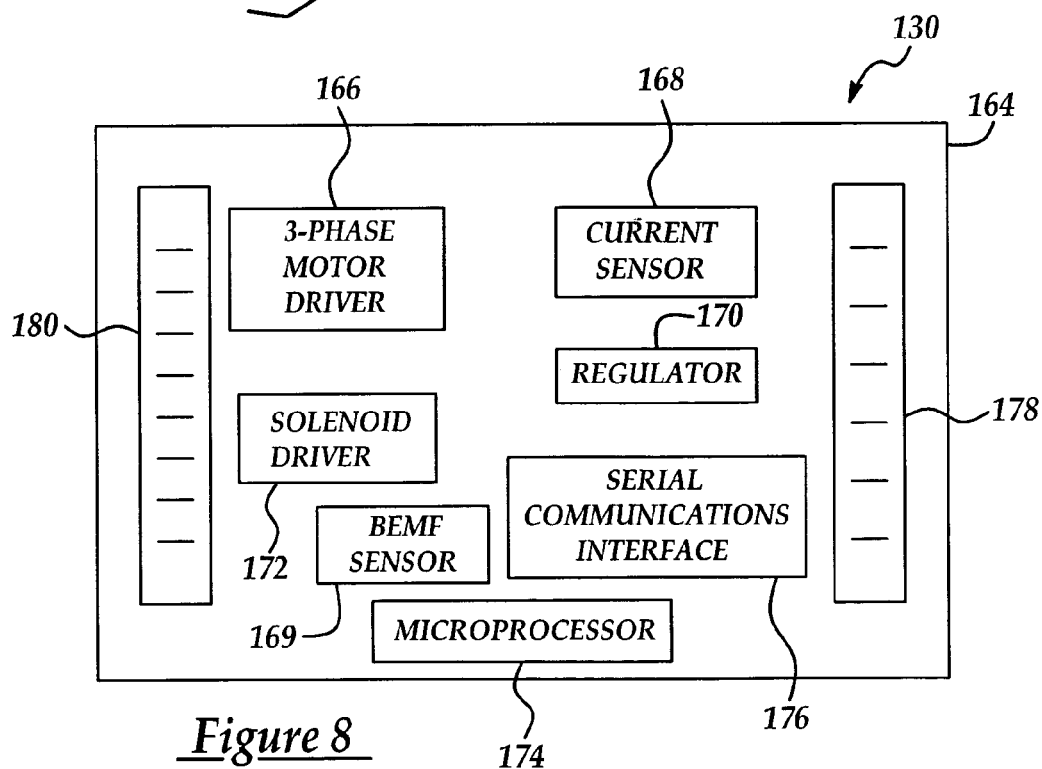
FIG. 8 is a block diagram of the programmable control circuit of the preferred embodiment of the present invention.

The programmable control circuit 130, generally indicated in FIG. 7 is shown in block diagram form in FIG. 8. The control circuit 130 is a group of circuits mounted on a printed circuit board 164 that is disposed within the electronics housing 24 that provides electric and electronic circuits to control the operation of the motor 12 so as to effect the position and speed of the windshield wiper 14. The programmable control circuit 130 includes a 3 (three) phase motor driver circuit 166, a current sensor 168, a back-electromotive force (BEMF) sensor 169, a voltage regulator 170, a solenoid driver 172, a microprocessor 174, and at least one serial communications interface 176. The circuit board 164 also includes a 6-pin connector 178 and an 8-pin connector 180 to allow electrical communication with the other components of the system.

The 3-phase motor driver circuit 166 provides electromotive force to drive the motor. The 3-phase motor driver circuit 166 is a bridge circuit that utilizes 6 (six) N-Channel power MOSFET semiconductor devices in three half-bridges between the input voltage and the return, or ground. The microprocessor 174 provides pulse width modulated (PWM) triggering, or biasing, signals to the 3-phase bridge driver circuit 166. These signals drive the MOSFETs and produce three separate voltages to apply to the stator windings. The 3 half-bridges produce the three output voltages in three separate phases that are provided in a ramping sequence to the windings of the stator 26 so that successive magnetic fields are generated and varied within the windings of the stator 26. The generation of successive magnetic fields within the stator windings acts to angularly repel the magnetic fields of the rotor assembly 30, thereby driving the rotor 30, the planetary gear set 22, and ultimately, the output shaft 88. The modulation of the PWM signals is performed in a known manner to control the duty cycle of the signals to the MOSFETs. This controls the duration of the phases of the 3-phase voltage output, thereby controlling the rotational speed of the rotor 30.

In producing the varying magnetic fields within the stator windings thereby creating rotor rotation, the ramping voltage waveform may be either sinusoidal or trapezoidal. Thus, the production of the three phase voltages from the 3-phase motor driver circuit 166 can be referred to as either sinusoidal or trapezoidal commutation. To properly control and time the commutation to drive the rotor 30 in the desired manner, the rotor position must be accurately determined, or sensed, as it rotates. This position sensing of the rotor 30 is used as feedback to the microprocessor 174. In the preferred embodiment, the rotor position is derived in a "sensorless" manner, meaning that the rotor position is derived electronically and indirectly to provide the necessary feedback to the microprocessor 174 with no additional physical sensors used about the motor. In sensorless commutation configurations, either a back-electromotive force (BEMF) sensor 169 (comprised of a resistive voltage divider and a low pass filter) or the current sensor 168 is used to detect the commutation, depending on the type of ramping waveform.

The preferred method of commutation (and rotor position detection) uses a trapezoidal waveform. As such, the preferred embodiment of the present invention uses a sensorless trapezoidal commutation scheme, which has a BEMF sensor 169 to detect the commutation electrically and indirectly from the stator windings to provide feedback to the microprocessor 174. More specifically, although called a sensor, by detecting a signal electronically and indirectly, the BEMF sensor 169 of the present invention is not a sensor in the common use of the word. The BEMF sensor 169 actually detects an induced magnetic flux signal within a portion of the stator windings and the microprocessor 174 uses this flux signal feedback to calculate the rotor position using an "extended Kalman estimator" algorithm. The microprocessor 174 then uses the calculated rotor position to generate the necessary PWM signals (to feed to the 3-phase bridge driver circuit 166) to properly time the trapezoidal commutation. In this commutation scheme, the current sensor 168 is only used to provide signals for motor current regulation and calculation of the output torque of the motor. It is not involved in the commutation.

In an additional non-limiting embodiment, sensorless sinusoidal commutation may be employed. In this case, the current sensor 168 is electrically connected to the ground side of the three half bridges (6 MOSFETs) or in such a manner as to detect the current of two of the three phases. Again, this is a sensorless (indirect) manner of determining rotor position, as the sensed current signals are fed back to the microprocessor 174 to calculate the rotor position using the "extended Kalman estimator" algorithm. The microprocessor 174 then uses the calculated rotor position to generate and provide the necessary PWM signals to control and time the sinusoidal commutation.

In other non-limiting embodiments, additional sensors may be physically located about the motor to provide a "sensored" commutation. For example, three Hall effect sensor devices may be physically disposed within the spacing of the stator windings, 120 electrical degrees apart, to provide feedback signals to the microprocessor 174 as a directly sensed feedback to control and time a trapezoidal based commutation.

The solenoid driver 172 is in electrical communication with the latching solenoid 44 disposed within the motor housing 20 and is operable to control the latching solenoid 44. When the solenoid driver 172 actuates the latching solenoid 44 it overcomes the biasing force of the biasing member 48 and withdraws the latching arm 46 from the rotor 30 allowing the rotor assembly 30 to rotate. In one preferred embodiment, the solenoid driver 172 may be of an "H" bridge type.

It should be appreciated that the microprocessor 174, as a device, is generally described and may be a complex microprocessor or any of another lesser type of integrated circuit such as a digital signal processor. As such, the microprocessor 174 includes a memory that is programmable to retain at least one predetermined windshield wiper control scheme. It should be appreciated by those of ordinary skill in the art that the microprocessor 174 has a memory capable of retaining a stored data program having instructions for the control of the wiper motor assembly 12. Thus, the microprocessor 174 may employ a ROM (read-only-memory) that permanently stores an operational program, or a "flash" type memory that may be changed or updated, as well as a volatile RAM (random access memory). In the preferred embodiment, the microprocessor 174 has a semi-permanent flash memory, which is loaded by an external computer or a programming device. The flash memory retains its stored program data even after power is removed from the device, but may be updated or refreshed as necessary at any time during the service life of the wiper motor. The RAM of the microprocessor 174 is used to temporarily store data during the execution of the stored program while operating the wiper motor 12. The microprocessor 174 further includes an A/D (analog/digital) converter, a digital interface, and time capture circuitry. The A/D converter allows the digitally based microprocessor device to interact with the various circuits and devices that are analog based. The digital interface allows communication to digitally based components and circuits, and the time capture circuitry allows for timing and control of the various signals and operations under the control of the microprocessor 174.

The serial interface circuit 176 has a Local Interconnected Network (LIN) physical layer. The LIN layer allows interconnection between the two wiper motor assemblies 12 of a windshield wiper system through the use of a single wire connection. In this manner, the individual windshield wiper motor assemblies can communicate and the pre-determined programs stored in the flash memories can coordinate the wiper movements across the windshield. In the preferred embodiment, the serial interface circuit 176 uses two LIN layer circuits. The first LIN is for the interconnection with the vehicle. The second LIN is for communication with the second wiper motor. It should be appreciated by those of ordinary skill in the art that the serial interface and the LIN physical layers may be incorporated within the microprocessor 174 and that other known types of intercommunication networks, such as a control area network (CAN) for example, may also be employed with the direct drive windshield wiper assembly 10.

The preferred embodiment of the present invention is adapted to operate within a 12 volt DC environment, as is standard within the American automotive industry. However, in another non-limiting embodiment, the present invention is adapted to be operable in a 42 volt or comparable vehicle operating environment, which are currently being developed for, and/or are evolving in, foreign and domestic automotive markets.

The end cap 128 physically supports the printed circuit board 164, the latching mechanism 44, and the position sensor assembly 126. The end cap 128 is generally cup shaped having an open central cavity 182. As shown in FIG. 3, the printed circuit board 164 is disposed in bottom of the end cap 128, thereby closing off and sealing the open central cavity 182 from the ambient environment and protecting the enclosed electronic components. The end cap 128 has extension connectors 184, position sensor connectors 186 (FIG. 7), an external electrical connector 188 and latching solenoid housing 190. The extension connectors 184 extend upward through the base of the motor housing 21 and have stator electrical contacts 192, which clip into and electrically connect with the connector points 38 of the stator end plate 36. The stator electrical contacts 192 also have circuit board ends 194, which are disposed in a manner within the end cap 128 that allows them to engage and interconnect with certain contacts within the 8-pin connector 180 of the printed circuit board 164. The position sensor connectors 186 extend upward in a manner to engage the electrical contacts of the position sensor circuit 142. Similar to the stator electrical contacts 192, the position sensor connectors 186 also have circuit board ends 196, which are disposed in a manner within the end cap 128 that allows them to engage and interconnect with certain contacts within the 6-pin connector 178 of the printed circuit board 164.

The external electrical connector 188 has a recess 198 and a locking tab 200, or the like, which provides an environmentally protected interconnection with a wiring harness connector of the vehicle (not shown) in a typical manner. The external electrical connector 188 also includes a series of electrical contacts 202 that provide power and ground sources to the printed circuit board 164, and the LIN physical connections for the serial interface circuits 176. The latching solenoid housing 190 is a recessed compartment molded into the end cap 128 to receive the body of the latching mechanism 44. Solenoid electrical connectors 204 extend from the latching mechanism 44 through the end cap 128 to the 6-pin connector 178 on the printed circuit board 164. A vent hole 206 is disposed in the end cap 128 at the bottom of the latching solenoid housing recess 190. It contains a membrane 208 that allows the passage of air but not moisture.

In operation, the direct drive windshield wiper assembly 10 is installed in a motor vehicle in a position relative to a windshield such that a wiper 14, when attached to the output shaft 88 of the wiper assembly 10, can sweep across a portion of the windshield. A flash programming device (not shown) is connected to the external electrical connector 188 of the wiper assembly 10. It should be appreciated by those having ordinary skill in the art that a flash programming device may be interconnect to more than one wiper assembly or through a vehicle serial data bus, or the like, depending on the wiring of the vehicle and if data bus interconnections are used between vehicle systems. The flash memory of the microprocessor 174 is then "flashed" or loaded with a predetermined wiper control program, which contains specific parameters, such as, the wipe area of the windshield, the predetermined in-wipe and out-wipe positions of the windshield wiper blade, and the desired wiper speed profiles, as well as dynamic control parameters of motor position, speed, torque and current. The wiper assembly is then calibrated as to the lower and upper sweep limits by placing the wiper in the appropriate physical position then programming that position in the memory. It should be appreciated that a "park" position is then either programmed into the assembly or is calculated by a programming algorithm, which will move the wiper assembly 10 to the desired position and then locks it with the latching mechanism 44 when required. In this way, no additional physical devices or apparatus are required to lock and hold the wiper in its predetermined "park" position. If more than one wiper assembly 10 is employed on the vehicle, the microprocessors 174 of each assembly may be coordinated in a predetermined windshield wiper control scheme, one to the other, using the serial interface circuitry, to provide the proper sweep profile and avoid a clash of wipers on the windshield.

During wiper operation, the wiper assembly 10 utilizes the upper and lower sweep limits and the program stored in the flash memory to control the sweep of the wiper 14 across the windshield 16. It should be appreciated that various control programs can be stored in the programmable control circuit 130, which consider and incorporate external environmental parameters that influence the wiper operation. For example, the speed of the vehicle, the amount and type of ambient precipitation, and the ambient and interior temperatures may be factored into the control of the sweep of the wiper. Additional weather considerations, such as ice on the windshield and/or a build-up of snow at the lower end of the sweep may be countered by a particular change to the sweep speed and torque of the wiper to clear such conditions, if the programming so dictates.

Thus, the windshield wiper system of the present invention utilizes individual direct drive brushless DC motors for coordinated, but mechanically independent control of the windshield wiper. The present invention acts to maximize the angular velocity of the blade assemblies between in-wipe and out-wipe positions thereby reducing the duration of each wipe cycle while limiting the noise and inertia loading by efficiently structuring the DC motor and by controlling the velocity of the blade assemblies as they approach the wipe limits. In addition, the windshield wiper system of the present invention eliminates the complex linkages employed in the related art to convert single angular motion of the wipe motor into two-way linear reciprocal motion used to drive a pair of windshield wiper arms. Thus, the present invention requires a smaller operational envelope than devices employed in the related art.

The present invention employs a position sensor that senses the rotational speed and position of the windshield wiper and will not loose these parameters even in the event of a power loss. Thus, the windshield wiper system of the present invention will not become unsynchronized and therefore will not clash due to an inability to maintain the sense of wiper arm position. The present invention also employs a latching mechanism that secures the motor and thus the output of the motor in a non-rotational disposition when the motor is off. Furthermore, the present invention includes an integrated control circuitry that achieves position sensing such that the wiper art position is known regardless of rotation and such that the detected arm position is not lost during power loss or loss of motion.

Finally, the windshield wiper system of the present invention may be employed in either a standard 12 volt or the more efficient 42 volt-based automotive electrical system.

The invention has been described in an illustrative manner. It is to be understood that the terminology that has been used is intended to be in the nature of words of description rather than of limitation. Many modifications and variations of the invention are possible in light of the above teachings. Therefore, within the scope of the appended claims, the invention may be practiced other than as specifically described.

We claim:

1. A windshield wiper assembly comprising:
   at least one motor having an output shaft and a windshield wiper operatively connected to said output shaft such that said windshield wiper may be driven in repeated wiping motion across the surface of the windshield;

said motor including a stator adapted to provide an electromagnetic flux and a rotor assembly supported for rotation about said stator, said rotor assembly including a back iron defining an inner circumference, a rotor cap operatively coupled to said back iron and an annular magnet mounted to said inner circumference of said back iron so as to be disposed in radially spaced annular relationship about said stator, said motor further including a planetary gear set including a sun gear operatively supported by said rotor cap for rotation with said rotor assembly, said rotor assembly operatively connected to said output shaft through said rotor cap and said sun gear and responsive to the electromagnetic flux generated by said stator so as to provide a rotational force to said output shaft to drive said windshield wiper in repeated wiping motion across the windshield.

2. A windshield wiper assembly as set forth in claim 1 wherein said planetary gear set is operatively connected in co-axial relationship to said output shaft of said motor to reduce the speed of the rotational output of said motor to said windshield wiper.

3. A windshield wiper assembly as set forth in claim 2 wherein said planetary gear set further includes a ring gear, a carrier, and a plurality of planet gears operatively supported by said carrier, said planet gear is disposed in meshing relationship with said sun gear and said ring gear and operable to reduce the speed of the rotational output of said output shaft of said motor.

4. A windshield wiper assembly as set forth in claim 3 wherein said rotor assembly is operatively connected in driving relationship to said planetary gear set.

5. A windshield wiper assembly as set forth in claim 4 wherein said rotor cap has a central opening, said central opening including a plurality of splines, said sun gear including a plurality of teeth that are adapted to receive in meshing relationship with said splines formed in said central openings of said rotor cap.

6. A windshield wiper assembly as set forth in claim 1 wherein said motor includes a latching mechanism for securing said rotor assembly and thus said output shaft of said motor in non-rotational disposition when said motor is off.

7. A windshield wiper assembly as set forth in claim 6 wherein said rotor assembly includes a plurality of notches, said latching mechanism including an electromagnetic actuator which is operable to engage at least one of said notches formed on said rotor assembly to immobilize said rotor assembly when said motor is off.

8. A windshield wiper assembly as set forth in claim 7 wherein said plurality of notches are defined on at least one end of said back iron.

9. A windshield wiper assembly as set forth in claim 1 wherein said annular magnet is a unitary molded permanent magnet.

10. A windshield wiper assembly as set forth in claim 9 wherein said molded permanent magnet is made of elements including niobium, iron, and boron.

* * * * *